(12) United States Patent
Boldrini et al.

(10) Patent No.: US 7,497,319 B2
(45) Date of Patent: Mar. 3, 2009

(54) PRODUCTS FEEDING UNIT

(75) Inventors: Fulvio Boldrini, Ferrara (IT); Daniele Coi, Bologna (IT)

(73) Assignee: Azionaria Costruzioni Macchine Automatiche A.C.M.A. S.p.A., Bologna (IT)

( * ) Notice: Subject to any disclaimer, the term of this patent is extended or adjusted under 35 U.S.C. 154(b) by 60 days.

(21) Appl. No.: 10/590,174

(22) PCT Filed: Feb. 18, 2005

(86) PCT No.: PCT/IB2005/000443

§ 371 (c)(1),
(2), (4) Date: Aug. 18, 2006

(87) PCT Pub. No.: WO2005/082749

PCT Pub. Date: Sep. 9, 2005

(65) Prior Publication Data

US 2007/0137983 A1 Jun. 21, 2007

(30) Foreign Application Priority Data

Feb. 19, 2004 (IT) .......................... BO2004A0085

(51) Int. Cl.
*B65G 47/08* (2006.01)

(52) U.S. Cl. .................... 198/419.3; 198/426; 198/431; 198/429

(58) Field of Classification Search .............. 198/419.3, 198/429, 431, 426
See application file for complete search history.

(56) References Cited

U.S. PATENT DOCUMENTS

| 3,637,091 | A | | 1/1972 | Mickelson | |
|---|---|---|---|---|---|
| 4,041,672 | A | | 8/1977 | Gularte | |
| 5,410,861 | A | | 5/1995 | Medlock | |
| 6,019,213 | A | * | 2/2000 | Schubert | 198/419.3 |
| 6,199,680 | B1 | * | 3/2001 | Sakai et al. | 198/419.2 |
| 6,640,961 | B2 | * | 11/2003 | Cavallari | 198/460.2 |
| 6,953,113 | B2 | * | 10/2005 | Iwasa et al. | 198/419.1 |

FOREIGN PATENT DOCUMENTS

| EP | 0496046 A1 | 7/1992 |
|---|---|---|
| WO | WO 97/11014 | 3/1997 |
| WO | WO 01/85581 A1 | 11/2001 |

* cited by examiner

*Primary Examiner*—Mark A Deuble
(74) *Attorney, Agent, or Firm*—Timothy J. Klima

(57) ABSTRACT

Products (6) are fed in an ordered succession by a unit (100) comprising a conveyor unit (1) equipped with pockets (43, 53), an outfeed conveyor (3) on which products (6) advance in succession at a given pitch (p2), also a transfer unit (2) operating between the conveyor unit (1) and the outfeed conveyor (3). The conveyor unit (1) presents a first belt (4) and a second belt (5) placed one beside the other and equipped with independent motors (M1, M2), whilst the pockets (43, 53) are arranged in first and second groups, each comprising a given number (n) of pockets ordered at constant pitch (p1) and associated respectively with the first belt (4) and the second belt (5), so that the groups are alternated one with another along a predetermined path (P). The transfer unit (2) includes an elevating platform (19) by which products (6) are ejected from the pockets (43, 53) and transferred at regular intervals to the outfeed conveyor (3), and the motors of the first and second belts (4, 5) are interlocked to a control unit (90) such as will ensure that the passage of each pocket is timed to coincide with an ejection stroke of the elevating platform (19).

17 Claims, 6 Drawing Sheets

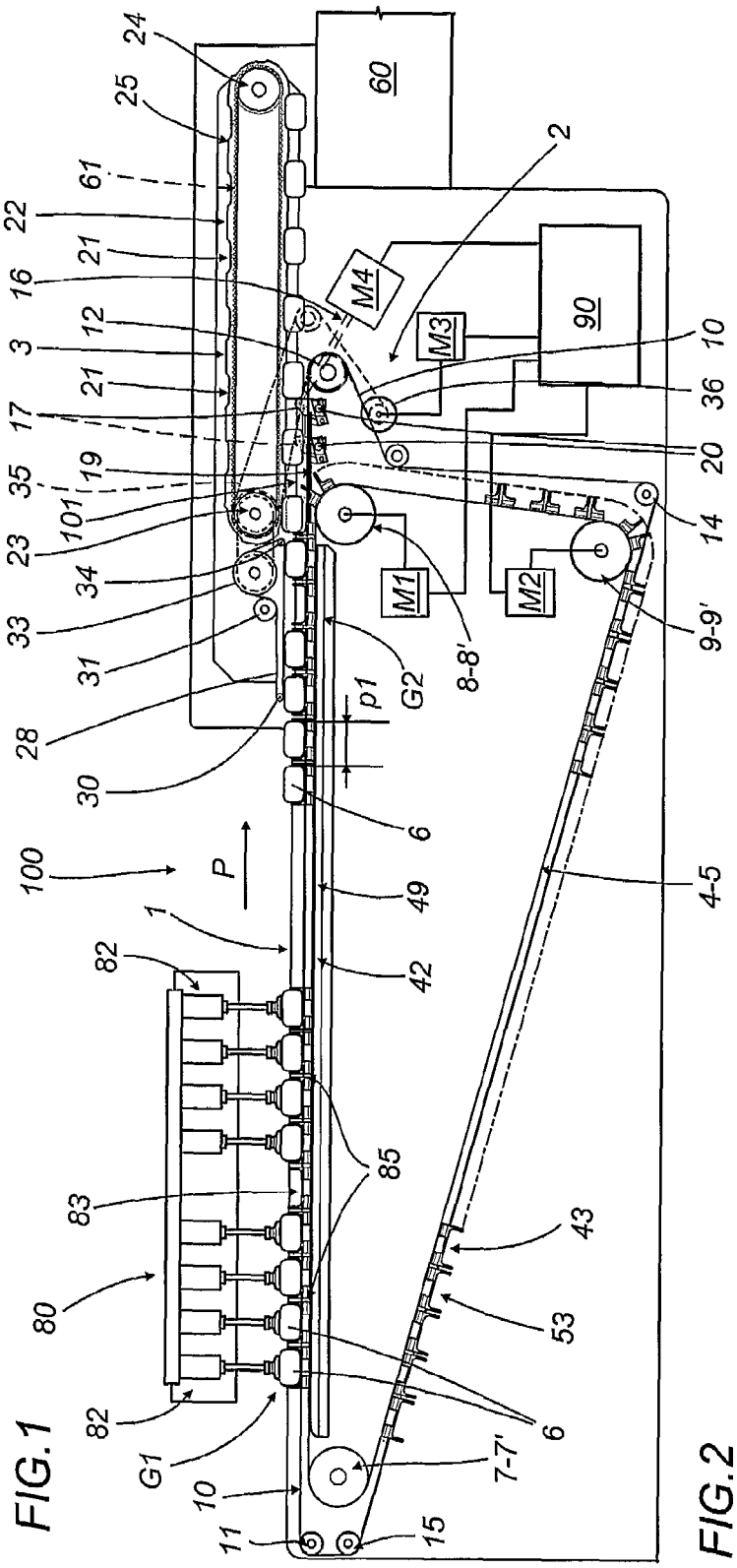

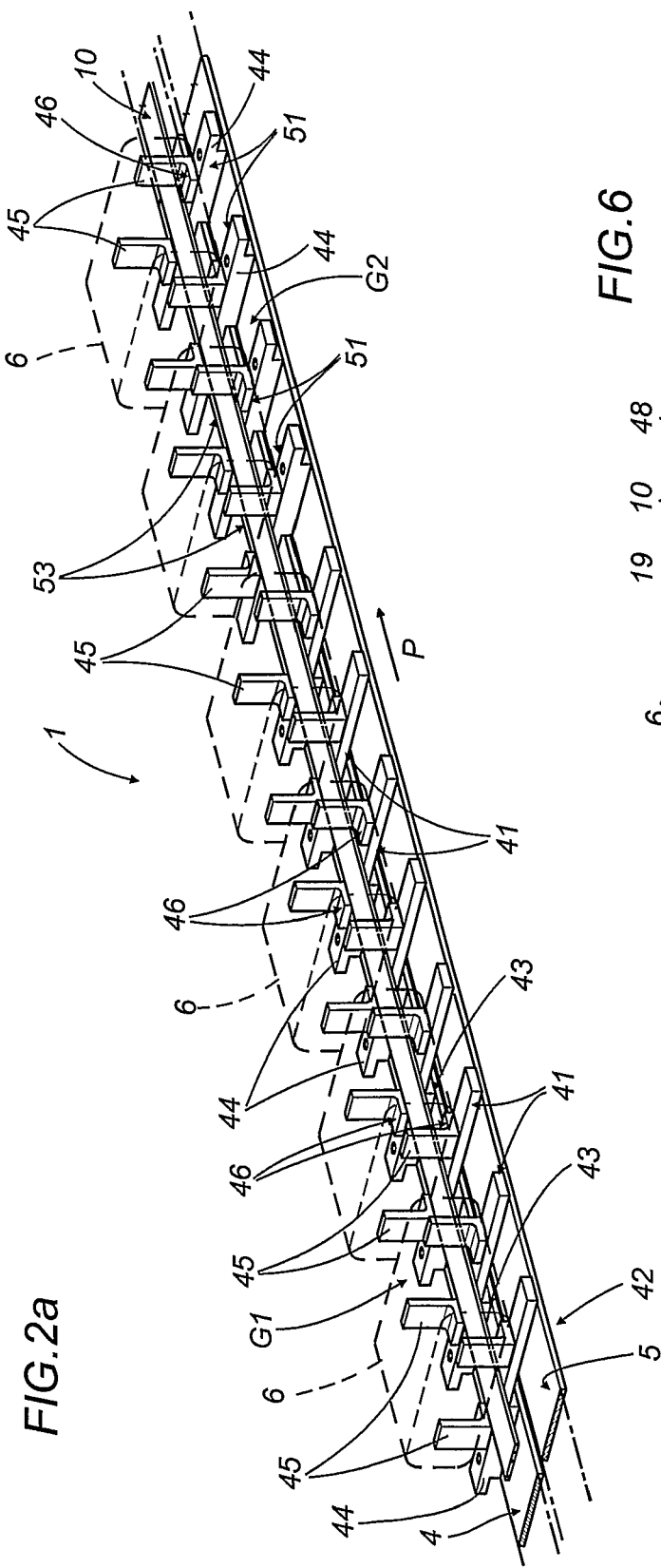
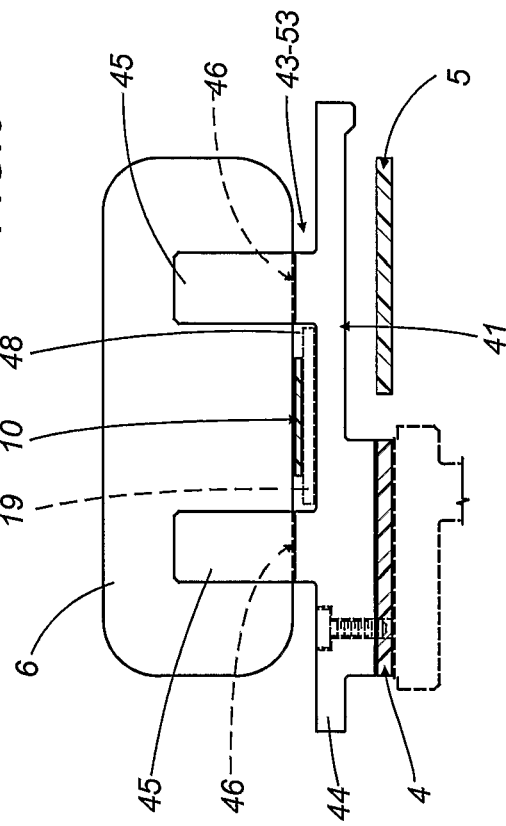

PRODUCTS FEEDING UNIT

This application is the National Phase of International Application PCT/IB2005/000443 filed Feb. 18, 2005 which designated the U.S. and that International Application was published under PCT Article 21(2) in English.

1. Technical Field

The present invention relates to a unit for feeding products in an ordered succession.

In particular, the invention relates to a unit by which products are fed in an ordered succession from a dispensing device to a user machine and finds application advantageously, though not exclusively, in the art field of machines for wrapping products such as bars of soap and the like.

2. Background Art

In wrapping machines typical of the prior art, products received from a conventional dispensing device must be ordered in succession and spaced apart at a regular distance one from the next.

The dispensing device, for example a device by which the products are transferred from a press to a conveyor belt, will be designed generally to feed the products to the belt cyclically and in rows of predetermined number. The user machine on the other hand, which might be a soap packer, needs to be fed continuously with a succession of products advancing at a predetermined pitch.

It has been found that conventional systems are not entirely able to satisfy these conditions, and are affected also by drawbacks attributable to the difficulty in reconciling the operating requirements of different dispensing devices with those of the user machines.

Accordingly, the object of the present invention is to overcome the drawbacks in question by providing a unit for feeding products in an ordered succession and at a predetermined pitch, and in particular, a unit simple in construction, versatile in application and especially suitable for transferring products that are easily damaged, such as bars of soap and the like.

DISCLOSURE OF THE INVENTION

The stated object is realized, according to the present invention, in a unit for feeding products in an ordered succession at constant pitch, as recited in the appended claims.

The invention will now be described in detail, by way of example, with the aid of the accompanying drawings, in which:

FIG. 1 illustrates a unit according to the invention, viewed schematically in a side elevation;

FIG. 2 shows the unit of FIG. 1 in a view from above;

FIG. 2a shows a detail of the unit in FIG. 1, viewed schematically and in perspective with certain parts omitted;

FIG. 6 shows an enlarged detail of FIG. 2a, viewed in a side elevation.

Figure 3A:
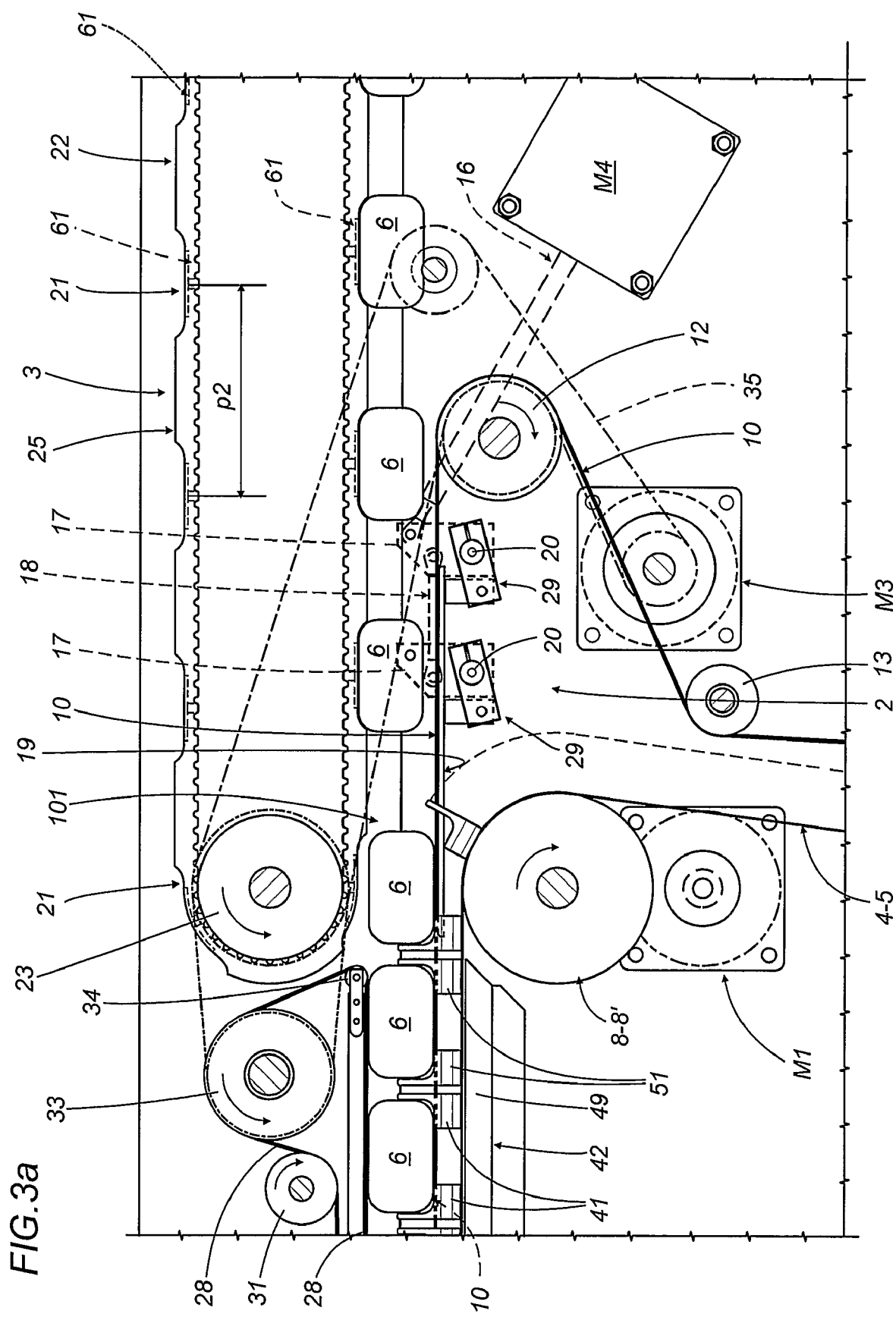
FIGS. 3a and 3b show an enlarged detail of the unit in FIG. 1, illustrated in two distinct operating positions.

Referring to FIGS. 1, 2 and 2a of the drawings, 100 denotes a unit, in its entirety, by which products 6 are fed in an ordered succession to a user machine 60.

The feed unit 100 comprises a conveyor unit 1 along which products 6 advance in succession, an outfeed conveyor 3 by which products 6 are directed in succession toward the aforementioned user machine 60, and a unit 2 by which products are transferred from the conveyor unit 1 to the outfeed conveyor 3.

In particular, as illustrated in FIG. 2a, the conveyor unit 1 extends along a predetermined path P and comprises a conveyor 42 consisting in a pair of conveyor belts 4 and 5 slidable, as discernible in FIG. 1, along a horizontal surface 49 and looped around pairs of pulleys 7-7', 8-8' and 9-9' positioned at respective vertices of a triangle defining the path P followed by the conveyor 42.

Each belt 4 and 5 carries a plurality of supporting elements or shaped walls 41 and 51, anchored stably and arranged in mutually opposed pairs, which are cantilevered in such a way as to bridge the central part of the conveyor 42 transversely and overhang the other belt 5 and 4. Each pair of walls denoted 41 forms a relative pocket denoted 43, and each pair of walls denoted 51 forms a relative pocket denoted 53.

The aforementioned pockets 43 and 53 are arranged in first and second groups denoted G1 and G2 respectively in FIG. 2a, each one of which can be made up of a given number "n" of relative pockets 43 and 53 distributed at a predetermined pitch p1 and in alternation along the path P. In the example of FIG. 1, for instance, the number of pockets making up each group G1 and G2 is n=9 (nine).

More exactly, and as discernible from FIGS. 2a and 6, each supporting element or wall 41 and 51 appears as a cross member 44 fixed to one or other belt 4 or 5, depending on the group G1 or G2, and two lateral upright members 45 rising from the cross member, each fashioned as an angle bracket of which the horizontal bottom leg 46 affords a rest serving to support a respective product 6.

In operation, a dispensing device, consisting for example in a press 80, will feed a succession of products 6 into one group G1 of pockets 43 carried in this instance by the belt denoted 4, during a pause in the motion of the conveyor 42.

In a preferred embodiment, the press 80 will form part of a soap plodder as described and illustrated in patent EP 1270459, filed by the present applicant, comprising two pluralities of pickup and transfer elements 82 by which products 6 spaced apart at a selected pitch p1 are transferred to the conveyor 42 in rows or sets (two rows of four products 6 each, in the solution illustrated). The example of FIG. 1 shows the rows of four products 6 being deposited cyclically on the belt 4 by the press 80 in pairs denoted 85, two rows of each pair 85 separated by an empty space 83 in the corresponding group G1 of pockets 43.

During this step of loading the products 6 onto the one belt 4, the other belt 5, driven by a respective motor M2, advances continuously and synchronously with means 19 by which the products 6 are ejected and distanced from the relative pockets 53; such means 19 form part of the aforementioned transfer unit 2 and occupy a position coinciding with a station 101 at which the selfsame products 6 are fed to the outfeed conveyor 3.

Once the products 6 have been taken up from the dispensing device, the hitherto motionless belt 4 is caused to accelerate by a respective motor M1, with the result that the gap between the leading pocket 43 of the relative group G1 and the trailing pocket 53 of the preceding group G2 will be reduced to the aforementioned pitch p1, whereupon the two pockets advance at the same speed. The cycle repeats for each loading step completed by the press 80, so that the intermittent output of the selfsame press 80 is matched to the tempo of the ejection and transfer means 19 and the continuous motion of the outfeed conveyor 3.

Where the rows of products 6 making up the pair 85 are separated by the aforementioned empty space 83, in particular, the gap will be closed by inducing a brief acceleration of the belts 4 and 5 upstream of the transfer station 101.

Adopting this solution, a control unit 90 can be employed advantageously to pilot the operation of the motors M1 and M2 in such a manner as to vary the rate at which the belts 4 and 5 advance, thereby taking up the space 83 between successive rows of eight products 6 and ensuring that the transfer unit 2 is supplied with a continuous succession of products 6 spaced apart at constant pitch p1.

Figure 3B:
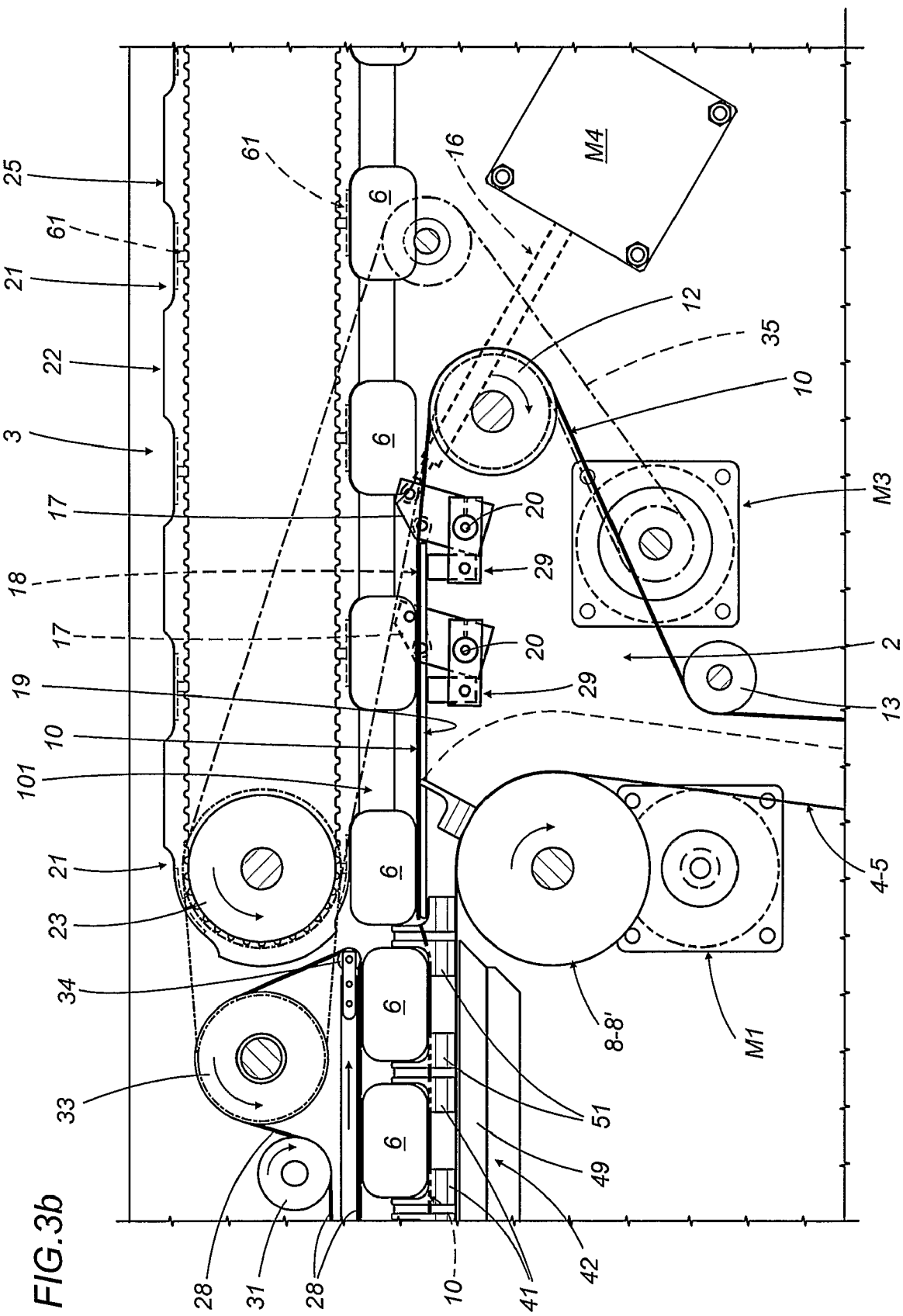
Figure 4:
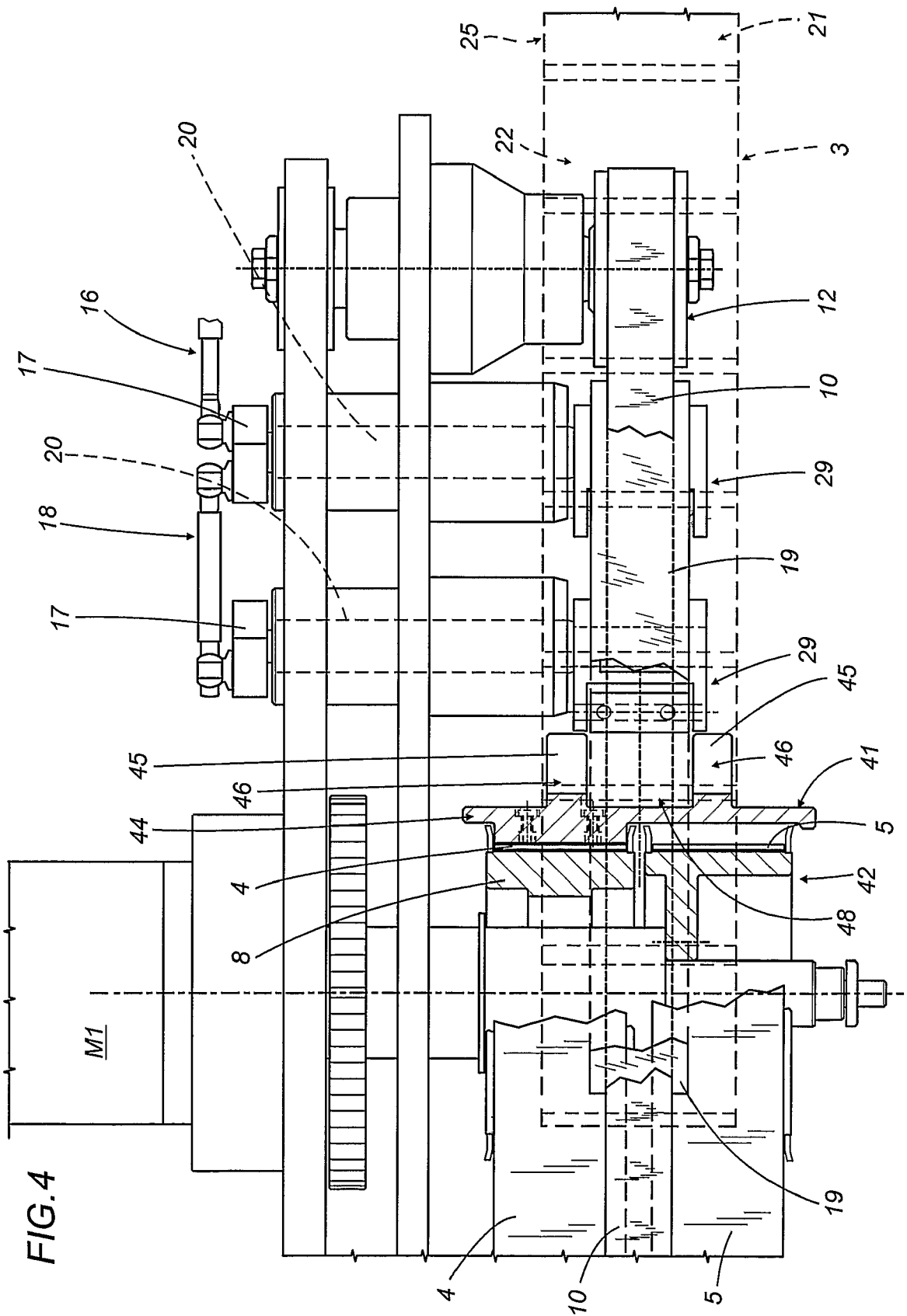
FIG. 4 shows the detail of FIGS. 3a and 3b, viewed from above and with certain parts omitted for greater clarity.

Referring to FIGS. 3 and 4, the transfer unit 2 and the respective transfer means 19 comprise an elevating platform 19, which in operation is disposed parallel with and raised above the belts 4 and 5 at the transfer station 101 where the products 6 are directed from the pocket conveyor 42 to the outfeed conveyor 3.

The elevating platform 19 is capable of movement in a vertical direction between a lowered first position of alignment with the products 6 advancing on the pocket conveyor 42 (FIG. 3a), in which the selfsame products are received, and a raised second position in which the products 6 are released to the outfeed conveyor 3, passing through an intermediate position that coincides with the ejection of the products 6 from the pocket conveyor 42.

As discernible in FIG. 4, the alternating motion of the elevating platform 19 and the frequency of its ejection stroke can be controlled by a mechanical linkage of articulated parallelogram type comprising a pair of rockers 17 mounted pivotably to respective horizontal shafts 20 connected one to another by a rod 18 and associated with the platform 19 by way of mountings 29, preferably tiltable, anchored to the underside of the selfsame platform 19.

One of the two shafts 20 can be made to rock back and forth by the linear action of a reciprocating actuator arm 16, the same movement being induced in the other shaft 20 by way of the connecting rod 18, with the result that the two mountings 29 and the associated platform 19 are caused to move up and down.

Also making up the transfer unit 2 are auxiliary transfer means, comprising a transport belt 10 of width such as will allow it to occupy the space 48 existing between the upright members 45 immediately below the level of the products 6 when conveyed in the pockets 43-53 of the belts 4 and 5.

The belt 10 is positioned centrally in relation to the belts 4 and 5 and looped around five pulleys 11, 12, 13, 14 and 15 combining to establish a path which is described by the belt 10 outside the peripheral compass of the paired belts 4 and 5, so as to extend above these same belts at least along a branch of the aforementioned path P located between the press 80 and the entry to the transfer station 101.

Passing through this same station 101, at which the products 6 are removed from the pocket conveyor 42, the belt 10 rides above the elevating platform 19 and serves as a supporting surface for the products 6 entering the station, extending as it does beyond the runout end of the top branch presented by the paired belts 4 and 5.

Advantageously therefore, thanks to the presence of the belt 10 in question, direct contact between the products 6 and the elevating platform 19 is avoided and the products can run out at high speed without suffering damage.

During the operation of the transfer unit 2, as a product 6 approaches the elevating platform 19, the shafts 20 and the mountings 29 will be set in motion by the actuator arm 16 so as to induce a vertical movement of the platform 19, causing it to raise the corresponding part of the auxiliary belt 10 occupied at this juncture by the product 6, which as a result will be lifted by the belt 10, ejected thus from the pocket conveyor 42 and directed toward the outfeed conveyor 3.

In the example illustrated, the outfeed conveyor 3 consists in a toothed conveyor belt 25 looped around two pulleys 23 and 24 and positioned above the station 101 at which the products 6 are removed from the conveyor 42.

The belt 25 presents a profile with projections 22 combining to establish a succession of recesses 21 equispaced at a constant pitch denoted p2, in which products 6 taken up in succession from the transfer unit 2 are accommodated and directed toward a user machine (a packer, for example, in the case of soap bars) denoted generically by the numeral 60.

The recesses 21 are connected to suction means, as indicated schematically by the numeral 61, in such a way as to retain the products 6 during the subsequent transfer step that takes them to the downstream machine 60.

The feed unit 100 might also comprise a hold-down belt 28 positioned at least in the vicinity of the ejection and transfer station 101 and delimiting a passage of height substantially identical to that of the products 6.

The belt 28 in question is looped around respective pulleys 30, 31, 33 and 34 and set at a height such that the bottom branch is positioned exactly over the products 6 advancing toward the station 101; thus, the products 6 remain cushioned between one belt 10 below and another belt 28 above.

Advantageously, the inclusion of the top belt 28 ensures that vibrations generated by the repeated impact of the elevating platform 19 against the auxiliary belt 10 will not be transmitted to the approaching products 6 (or at least that such vibrations will be attenuated), which otherwise could be damaged.

Still in FIG. 3a, the live pulleys 12, 23 and 33 of the relative belts 10, 25 and 28 are set in rotation by a system comprising a motor M3 and a single belt 35 looped over a power driven pulley 36.

With the adoption of a single drive for the three belts 10, 25 and 28, to advantage, the products 6 can be transported toward the transfer area on conveying surfaces subject to the same law of motion, so that the risk of impact or rubbing contact, attributable to different speeds of the belts in contact with the products 6, is eliminated or at least significantly mitigated.

According to the invention, the synchronous association between the movement of the toothed outfeed belt 25 and that of the pocket conveyor 42, also the frequency of the ejection stroke made by the elevating platform 19, can be governed by the control unit 90, which likewise monitors and controls the motion generated by the motors M1 and M2 driving the paired belts 4 and 5 of the pocket conveyor 42, by the motor M4 operating the arm 16 of the elevating mechanism, and by the motor M3 driving the transfer belts.

In particular, based on the motion of the toothed outfeed belt 25 (and therefore the frequency with which products 6 are transferred from the pocket conveyor 42, as determined by the pitch p2), the control unit 90 governs the motion of the pocket conveyor 42 and the belts 4 and 5 in such a way that the positioning of each successive product 6 at the ejection and transfer station 101 will coincide with the upward movement of the elevating platform 19.

In the event of the pocket conveyor 42 being driven intermittently (necessitated by the particular type of dispensing device employed, for example), the control unit 90 will compensate the pause made by the conveyor, piloting a subsequent increase in speed in such a way as to maintain continuity of the flow of products 6 toward the transfer unit 2.

It will be evident from the foregoing that the unit disclosed is able to feed products 6 toward a user machine 60 in a continuous, ordered succession, spaced apart at constant pitch p2, even with variations in the motion of the conveyor unit 1 and of the particular dispensing device by which the products 6 are deposited on the conveyor unit 1.

Figure 5:
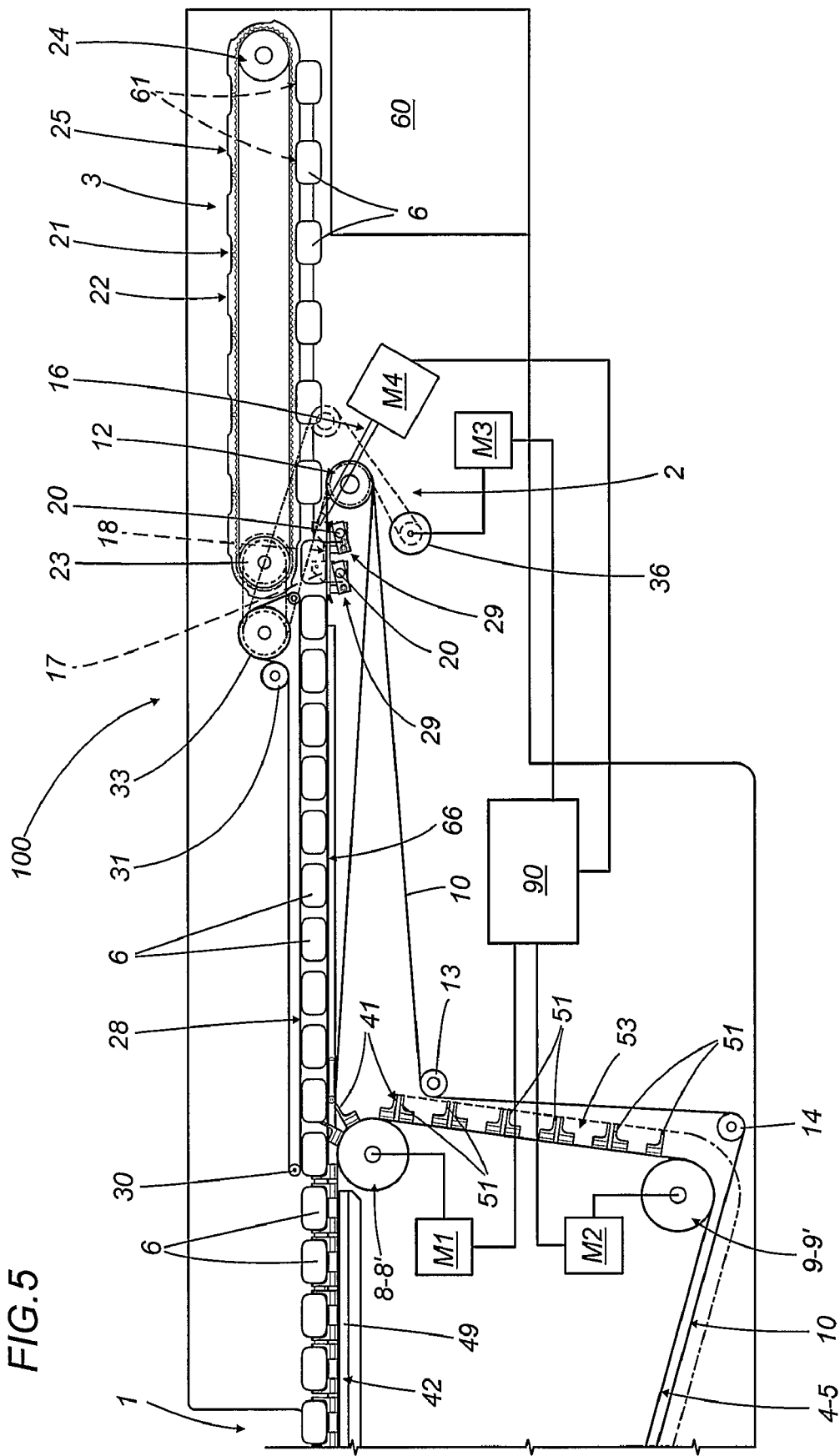
FIG. 5 illustrates the unit of FIG. 1 in a second embodiment, viewed in a side elevation.

FIG. 5 of the drawings illustrates a second possible embodiment of the transfer unit 2 according to the invention.

For the sake of clarity, corresponding parts are denoted by the same numerals as in FIGS. 1 to 4.

In this second embodiment, the auxiliary belt 10 is extended further beyond the pocket conveyor 42, supported slidably by a table denoted 66, and again caused to operate in conjunction with a hold-down belt 28 similar in all respects to the belt 28 mentioned previously and therefore not described in detail.

Likewise, the transfer unit 2, with the elevation platform 19 operated by the rockers 17 in the manner already described, is again positioned under the runout portion of the aforementioned belt 10 and coinciding with the station at which products are transferred to the outfeed conveyor 3.

With this solution, to advantage, the advancing products 6 are afforded greater protection and allowed a longer run on the approach to the transfer station 101 and through to the user machine 60.

The invention claimed is:

1. A unit for feeding products in an ordered succession, comprising a conveyor unit with pockets in receipt of products from a dispensing device and extending thence along a predetermined path to a transfer station, an outfeed conveyor by which products are directed in succession and at constant pitch toward a user machine, and a transfer unit operating between the conveyor unit and the outfeed conveyor, wherein the conveyor unit comprises a first belt and a second belt placed one beside the other and set in motion by independent drive means, and the pockets are arranged in first and second groups alternated one with another along the predetermined path, each comprising a given number of pockets ordered at constant pitch and associated respectively with the first belt and second belt; in that the transfer unit comprises means by which products are ejected from the pockets and transferred at predetermined intervals to the outfeed conveyor, and in that the movement of the first and second belts is governed by a control unit in such a way as to establish a predetermined phase relationship with the operating frequency of the ejection and transfer means; wherein the ejection and transfer means comprise an elevating platform, set in motion cyclically by respective drive means, such as will remove the products fed by the conveyor unit at a selected pitch.

2. A unit as in claim 1, wherein the elevating platform is capable of alternating vertical movement between a lowered first position of alignment with the conveyor unit in which the products are received, and a raised second position in which the products are released to the outfeed conveyor.

3. A unit as in claim 1, wherein at least the drive means of the paired belts and the drive means of the elevating platform are interlocked to the control means.

4. A unit for feeding products in an ordered succession, comprising a conveyor unit with pockets in receipt of products from a dispensing device and extending thence along a predetermined path to a transfer station, an outfeed conveyor by which products are directed in succession and at constant pitch toward a user machine, and a transfer unit operating between the conveyor unit and the outfeed conveyor, wherein the conveyor unit comprises a first belt and a second belt placed one beside the other and set in motion by independent drive means, and the pockets are arranged in first and second groups alternated one with another along the predetermined path, each comprising a given number of pockets ordered at constant pitch and associated respectively with the first belt and second belt; in that the transfer unit comprises means by which products are ejected from the pockets and transferred at predetermined intervals to the outfeed conveyor, and in that the movement of the first and second belts is governed by a control unit in such a way as to establish a predetermined phase relationship with the operating frequency of the ejection and transfer means; wherein the conveyor unit comprises hold-down belt positioned at least in the vicinity of the ejection and transfer station and delimiting a passage of height substantially identical to that of the products.

5. A unit for feeding products in an ordered succession, comprising a conveyor unit with pockets in receipt of products from a dispensing device and extending thence along a predetermined path to a transfer station, an outfeed conveyor by which products are directed in succession and at constant pitch toward a user machine, and a transfer unit operating between the conveyor unit and the outfeed conveyor, wherein the conveyor unit comprises a first belt and a second belt placed one beside the other and set in motion by independent drive means, and the pockets are arranged in first and second groups alternated one with another along the predetermined path, each comprising a given number of pockets ordered at constant pitch and associated respectively with the first belt and second belt; in that the transfer unit comprises means by which products are ejected from the pockets and transferred at predetermined intervals to the outfeed conveyor, and in that the movement of the first and second belts is governed by a control unit in such a way as to establish a predetermined phase relationship with the operating frequency of the ejection and transfer means; wherein the transfer unit further comprises auxiliary transfer means operating in conjunction with the ejection and transfer means.

6. A unit as in claim 5, wherein each pocket is created between a pair of mutually opposed shaped supporting elements secured to one respective belt and cantilevered to overlap the other belt.

7. A unit as in claim 6, wherein the auxiliary transfer means comprise a transport belt positioned, at least in a vicinity of the transfer station, along the predetermined path and above a platform by which the products are ejected from the conveyor unit.

8. A unit as in claim 7, wherein the transport belt occupies a space between upright members of the supporting elements, to advance interposed between the ejection and transfer means and the products during ejection.

9. A unit as in claim 7, wherein the transport belt extends along the predetermined path, running parallel with and between the first and second belts of the conveyor unit, and raised above these same belts at least along the part of the path extending between the dispensing device and the entry to the transfer station.

10. A unit as in claim 9, wherein the conveyor unit comprises a hold-down belt positioned at least in the vicinity of the ejection and transfer station and delimiting a passage of height substantially identical to that of the products.

11. A unit as in claim 10, wherein the outfeed conveyor includes a conveyor belt positioned with an initial stretch above the ejection and transfer station and having a succession of recesses equispaced at a selected pitch, each furnished with suction means serving to retain the products.

12. A unit as in claim 11, wherein the transport, outfeed and hold-down belts are driven by common drive means.

13. A unit as in claim 10, wherein the transport, outfeed and hold-down belts are driven by common drive means.

14. A unit as in claim 9, wherein the transport belt extends beyond an end of the conveyor unit in a feed direction, supported slidably by a table, and operates in conjunction with a hold-down belt positioned above the table.

15. A unit as in claim 14, wherein at least the drive means of the paired belts and the drive means of the elevating platform are interlocked to the control means.

16. A unit as in claim 15, wherein the drive means of the transport, outfeed and hold-down belts are also interlocked to the control means.

17. A unit as in claim 7, wherein the transport belt extends beyond an end of the conveyor unit in a feed direction, supported by a table, and operates in conjunction with a hold-down belt positioned above the table.

* * * * *